Aug. 19, 1958 W. A. MILLER 2,848,023
FEED ATTACHMENT FOR WOODWORKING MACHINE
Filed May 15, 1956 2 Sheets-Sheet 1

Walter A. Miller
INVENTOR.

BY *Clarence A. O'Brien*
*and Harvey B. Jackson*
Attorneys

Walter A. Miller
INVENTOR.

United States Patent Office 2,848,023
Patented Aug. 19, 1958

2,848,023

FEED ATTACHMENT FOR WOODWORKING MACHINE

Walter A. Miller, West Bend, Wis.

Application May 15, 1956, Serial No. 584,914

3 Claims. (Cl. 144—246)

The present invention relates to new and useful improvements in feeding attachments for woodworking machines such as saws, planers, shapers, joiners and the like.

An object of the invention is to provide an easily attached combined feeder and hold-down mechanism for feeding the work at a uniform speed to the machine and at the same time holding the work on the table to relieve the operator of this detail.

Another object of the invention is to provide a power driven rubber feed roller mounted on a support adapted for attaching to a saw table or the like, and including forward and reverse drive shafts for selectively coupling the motor for a portable power tool thereto to drive the roller by means of reduction gearing to feed work to a woodworking machine at a predetermined uniform speed.

A further object is to provide a mounting for a portable power driven feed roller and which is secured to a woodworking table by means of a bracket on which the mounting is vertically adjustable to compensate for variations in the thickness of the work to be fed to the machine.

A still further object is to provide a device of this character of simple, practical and compact construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
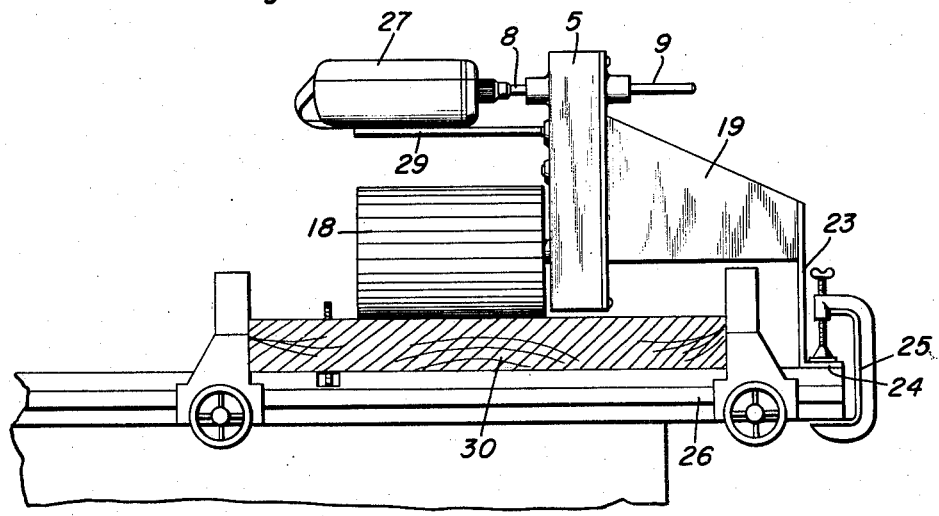
Figure 1 is a side elevational view.
Figure 2:
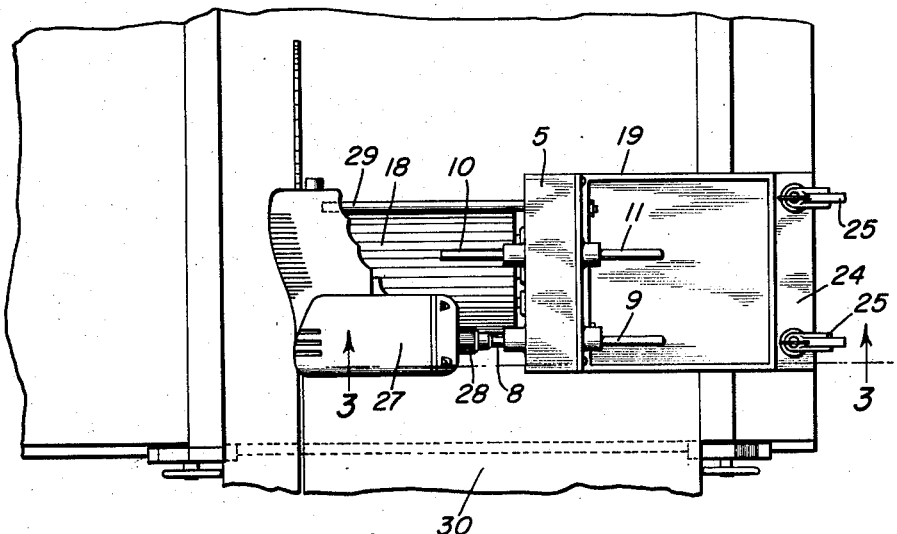
Figure 2 is a top plan view.
Figure 3:
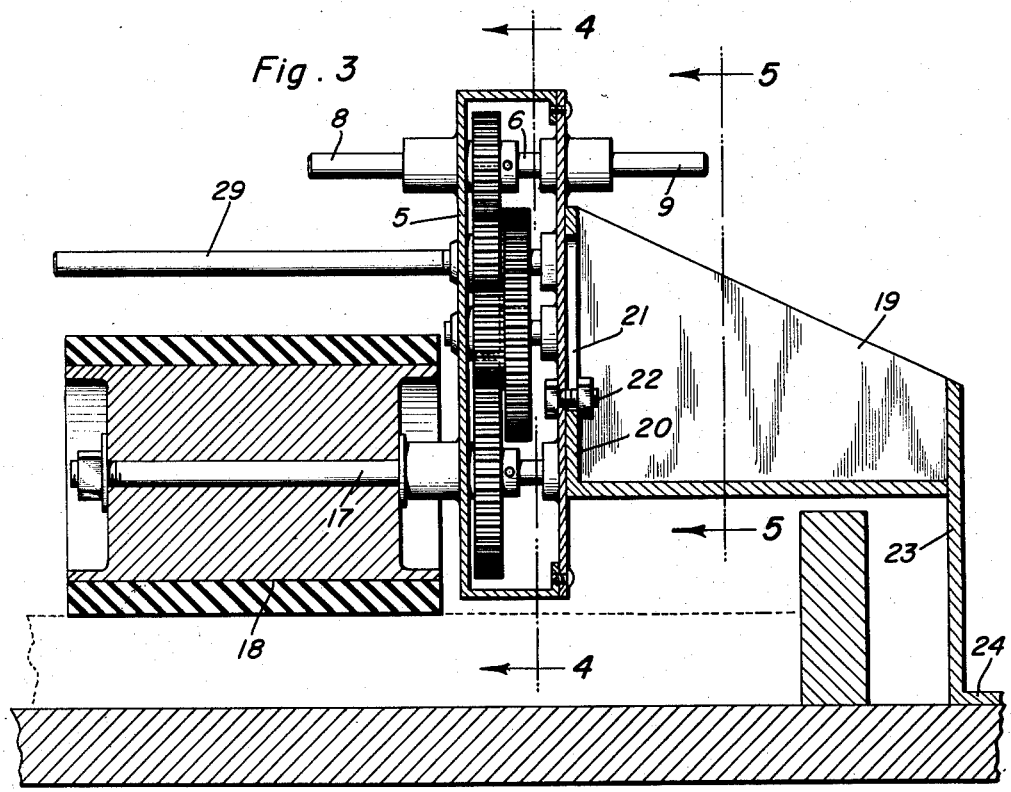
Figure 4:
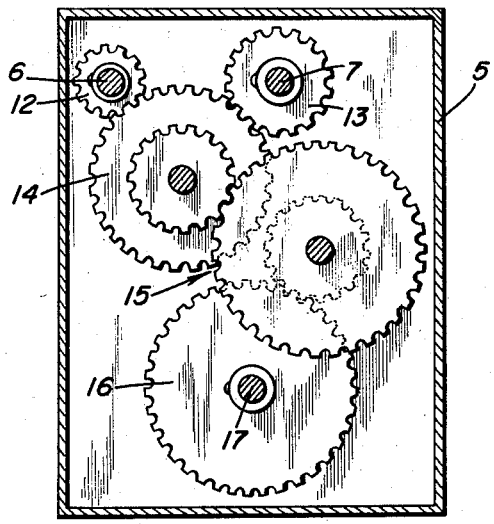
Figure 5:
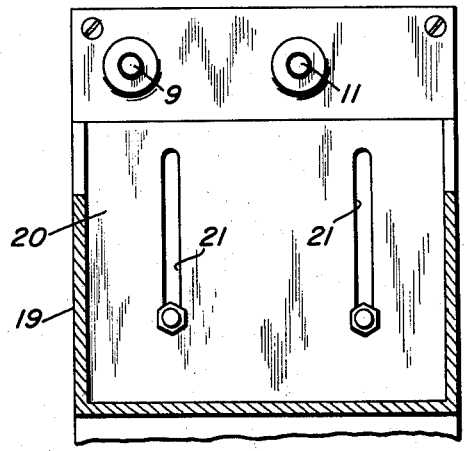

Figure 3 is an enlarged vertical sectional view taken on a line 3—3 of Figure 2; and, Figures 4 and 5 are transverse sectional views taken respectively on the line 4—4 and 5—5 of Figure 3.

Referring now to the drawings in detail, wherein for the purpose of illustration I have disclosed a preferred embodiment of my invention, the numeral 5 designates a gear housing in the upper portion of which a pair of shafts 6 and 7 are journaled. Shaft 6 has a front end 8 projecting outwardly at the front of the housing and a rear end 9 projecting outwardly at the rear of the housing. Shaft 7 likewise has front and rear ends 10 and 11 projecting outwardly at the front and rear, respectively, of the housing. A spur gear 12 is secured to shaft 6 and a spur gear 13 is secured to shaft 7 and the gears are of different ratios.

Each gear 12 and 13 is meshed with a gear 14 which in turn is meshed with reduction gearing designated generally at 15 for driving a gear 16 which is secured to a shaft 17 journaled in the lower portion of housing 5 to drive gear 16 and shaft 17 at a reduced speed. Shaft 17 projects outwardly at the front lower portion of housing 5 and to the outer end of which a rubber covered feed roller 18 is secured and which may be corrugated at its outer surface to increase friction gripping action.

A bracket 19 includes a plate 20 which is secured in vertically adjusted confronting relation to the rear surface of housing 5 by a pair of vertical slots 21 in the plate to receive bolts and nuts 22 carried by the housing. The bracket is also provided with a leg portion 23 having an outwardly projecting foot 24 at its lower end for engagement by a pair of C-clamps 25 to secure the bracket on top of one edge portion of a saw or other woodworking table 26.

A portable electric drill 27 is selectively connected by its chuck 28 to one of the front or rear ends of either of the shafts 6 or 7 and when the drill is connected to the front end of either of the shafts the drill rests on an arm 29 which projects forwardly of the housing to support the drill above the roller 18. The drill rests on the bracket 19 when attached to the rear end of either of the shafts.

The housing 5 is adjusted on the bracket 19 to rest the roller on top of the work 30 on the saw table to feed the work to the saw 31 at a uniform speed.

The speed of the roller may be varied by selectively connecting the drill to the front ends of either of the shafts 6 or 7 and the difference in the ratios of gears 12 and 13 on the respective shafts will vary the driving speed of the roller.

By connecting the drill to the rear ends of shafts 6 and 7 the direction of rotation of the roller will be reversed to reverse the direction of feed of the work.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a feeding and hold-down device for woodworking machines of a type including a table, a gear housing, a drive shaft journaled in the housing and having free front and rear end portions projecting outwardly at opposite sides of the housing, a portable power means selectively attached to either end of the shaft to reverse the direction of drive thereof, a feed roller rotatably supported at the front of the housing, gear drive means in the housing connecting the roller to the shaft, attaching means for the housing and supporting the same above the table of the machine, and supporting means on the housing for the power means.

2. The construction of claim 1 and said supporting means underlying the front end of the shaft and on which the power means rests to support the same above the roller.

3. In a feeding and hold-down device for woodworking machines of a type including a table, a gear housing, a pair of drive shafts journaled in the upper portion of the housing and each having free end portions projecting outwardly at the front and rear sides of the housing, a spur gear secured to each shaft and of different ratios, a roller rotatably supported at the front of the housing, gear drive means in the housing for the roller and in driving engagement with both of said spur gears to vary the speed of the roller, a portable power means selectively connected to either end of either of said shafts to reverse the direction of the roller, attaching means securing the housing to the table to support the roller in an elevated position above the table, and supporting means on the housing for the power means.

References Cited in the file of this patent

UNITED STATES PATENTS

| | | |
|---|---|---|
| 940,016 | Hick | Nov. 16, 1909 |
| 2,662,562 | Lindell | Dec. 15, 1953 |
| 2,696,228 | Bowen | Dec. 7, 1954 |
| 2,773,525 | Schutz | Dec. 11, 1956 |